United States Patent Office 2,838,900
Patented June 17, 1958

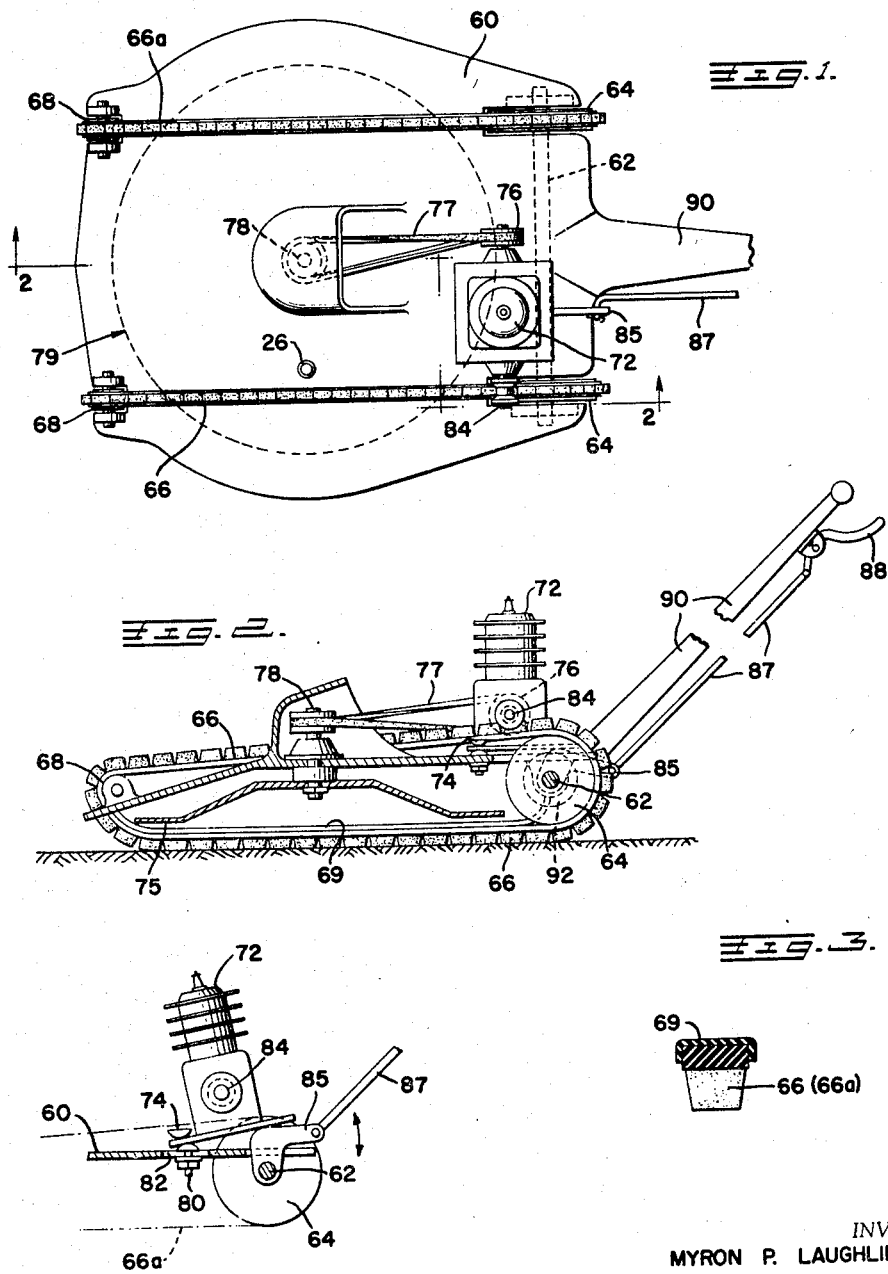

2,838,900
ROTARY MOWER WITH ENDLESS TREAD SUPPORTING MEANS

Myron P. Laughlin, St. Petersburg, Fla.

Original application December 4, 1951, Serial No. 259,833, now Patent No. 2,742,751, dated April 24, 1956. Divided and this application October 27, 1955, Serial No. 543,085

3 Claims. (Cl. 56—25.4)

This invention relates to lawn mowers and to driving mechanism therefor. More particularly, this invention relates to a lawn mower ground driving mechanism of improved type as originally disclosed in my application, Serial No. 259,833 now Patent 2,742,751 filed December 4, 1951, and entitled Lawn Building Method and Apparatus, and of which this case is a division.

Certain other improvements and advantages will appear as a description of a preferred embodiment progresses and by reference to the appended drawing in which—

Fig. 1 is a plan view of the improved type of apparatus.

Fig. 2 is an elevation taken in section along the line 2—2 of Fig. 1.

Fig. 3 is an enlarged elevational view with parts broken away and shown in section of the tread mounting from the apparatus of Figs. 1 and 2.

Fig. 4 is an elevational view with parts broken away and shown in section of the device shown in Fig. 2.

In these figures, 60 indicates the platform of my improved apparatus. Platform 60 is provided at its rear with a cross journal shaft 62 whereon is mounted tread wheels 64 supporting flexible treads 66, 66a which pass forwardly over and under the platform 60, over the supporting and guide rollers 68 and guide shoes 69. Rollers 68 and shoes 69 are supported by attachment to extensions of platform 60 at the front and rear and together with wheels 64 serve to guide treads 66 in such fashion that the same may be operated to support and drive the remaining mechanism which consists of a drive motor 72 affixed to platform 60 as at 74 and provided with sheave 76, operating belt 77 and there through spindle 78. Spindle 78 passes downwardly through the platform 60 and serves to mount there beneath cutter bar 75 so that the same may be rotated in approximately the circle indicated by the dotted lines 79 in Fig. 1. Power motor 72 is preferably secured by such means as a bolt 80 attaching it through slot 82 in platform 60 as shown in Fig. 4 so that the belt 77 may be adjusted. The mounting 74 also provides for the hinging upwardly of power motor 72 so that its traction drive sheave 84 may be caused to clear the tread 66 when a cam 85 is operated by the rod 87 and the hand piece 88 both mounted on the handle 90. Cam 85 may be pivoted on shaft 62 as indicated in Fig. 4. It will be understood that while the left hand tread 66 is here indicated as driven directly from the power motor 72, that the wheels 64 and the axle 62 transmit the motion also to the right hand treads and both treads are driven. It will be understood, however, that a suitable clutch 92 may be inserted in axle shaft 62 so that the two treads may be independently operated for steering and like purposes and while two treads are shown, it will be clear that a single centrally located tread would serve many of the purposes described and will be well within the scope of my invention. The construction of shoe 69 is best seen in Fig. 3 and it will be understood serves merely to guide the tread 66 after it leaves the guide sheaves 66.

In operation of the mechanism above described, motor 72 is set in motion whereupon the cutter 75 revolves and hand piece 88 is manipulated to cause friction drive sheave 87 to engage tractor tread 66 driving the top of this tread toward the front of the machine and over guides 68, 69 and 64 to the drive sheave again. It will be plain, upon inspection of Fig. 2, that guide shoes 69 keep the tread spaced from the cutter 75 and prevent interference between the cutter and the treads and with the terrain passed over so that the device is particularly suited to rough and uneven terrain. It will be manifest that a single tread may easily supply sufficient traction to drive the relatively light mower mechanism since the ground contact is of much greater area than the wheels generally employed for such purposes. In the event of the use of a single tread, such would be preferably located somewhat closer to the center line as indicated in Fig. 1 but where two treads are employed, as shown for purposes of illustration in that figure, they are preferably spaced on either side of the center line and either or both may be employed for driving or steering, as mentioned above. Turning may, of course, be accomplished through manipulation of the handle and facilitated by tilting the mower slightly backward so that a lesser tread area is upon the ground. However, it will be understood that one of the prime advantages of my invention is the ability of such a tread driven mower to pursue an almost exactly straight line so that adjoining cuts may have a minimum of overlap and the full cut width of the mower utilized.

It will be clear that my improved mower construction and driving mechanism provide for minimum side clearance and that at the front of the mower the guide means 68 may be so recessed that the cutter is effective almost to the outer end of the necessary cutter guard.

It will be manifest that while I have described and illustrated mechanism particularly suited to the performance of my invention, many modifications therein may be made within the scope thereof and within the spirit of the appended claims.

What I claim is:

1. In a rotary lawnmower the combination which includes a platform, rotary cutter means disposed below the platform, power means mounted on said platform and operatively associated with said cutter means to drive the same, longitudinally disposed endless ground tread means mounted on said platform, said tread means having spaced upper and lower runs, said lower run being disposed below and parallel to said cutter means so as to contact and traverse the ground and support the platform and cutter means in spaced relation to the ground and serving also to maintain said cutter means in true parallel position with respect to the lawn being cut, said cutter means when driven rotating in a plane disposed between said upper and lower runs.

2 The lawnmower defined in claim 1 wherein said ground treads are multiple and traversely spaced on either side of the cutter means.

3. The lawnmower defined in claim 1, and which further includes manually operable means mounted on said platform for effect a driving connection between said power means and said tread means.

References Cited in the file of this patent
UNITED STATES PATENTS

| | | |
|---|---|---|
| 1,302,317 | Cowan | Apr. 29, 1919 |
| 1,445,039 | Pribnow | Feb. 13, 1923 |
| 1,722,531 | Matter | July 30, 1929 |

(Other references on following page)

UNITED STATES PATENTS

| | | |
|---|---|---|
| 1,764,851 | Palm | June 17, 1930 |
| 2,232,671 | Loder | Feb. 18, 1941 |
| 2,265,545 | Phelps | Dec. 9, 1941 |
| 2,289,768 | Fehrenbacher | July 14, 1942 |
| 2,393,309 | Cochran | Jan. 22, 1946 |
| 2,607,277 | Shelor | Aug. 19, 1952 |
| 2,608,935 | Moore | Sept. 2, 1952 |
| 2,630,185 | Adams | Mar. 3, 1953 |
| 2,644,539 | Gazda | July 7, 1953 |
| 2,668,408 | Klenk | Feb. 9, 1954 |
| 2,687,332 | Tilley | Aug. 24, 1954 |
| 2,736,389 | Phelps | Feb. 28, 1956 |